Dec. 26, 1961  J. A. POLSTER  3,014,322
WRAPPING MACHINE
Filed May 11, 1959  11 Sheets-Sheet 1

INVENTOR.
John A. Polster
BY
Carpenter, Abbott, Coulter & Kinney

Dec. 26, 1961 J. A. POLSTER 3,014,322
WRAPPING MACHINE
Filed May 11, 1959 11 Sheets-Sheet 2

INVENTOR.
John A. Polster
BY
Carpenter, Abbott, Coulter & Kinney

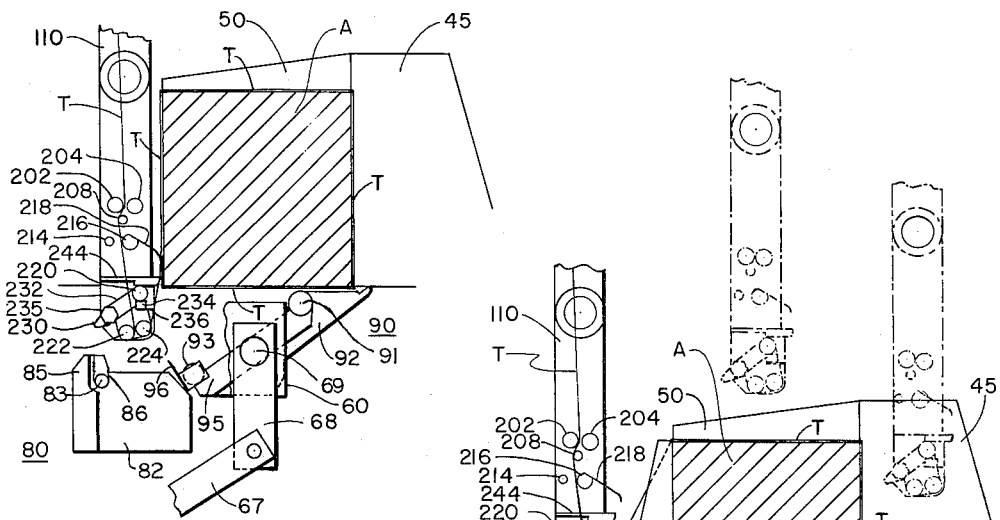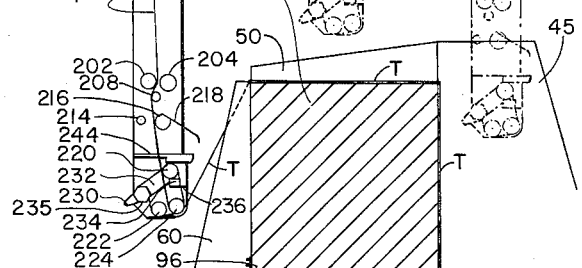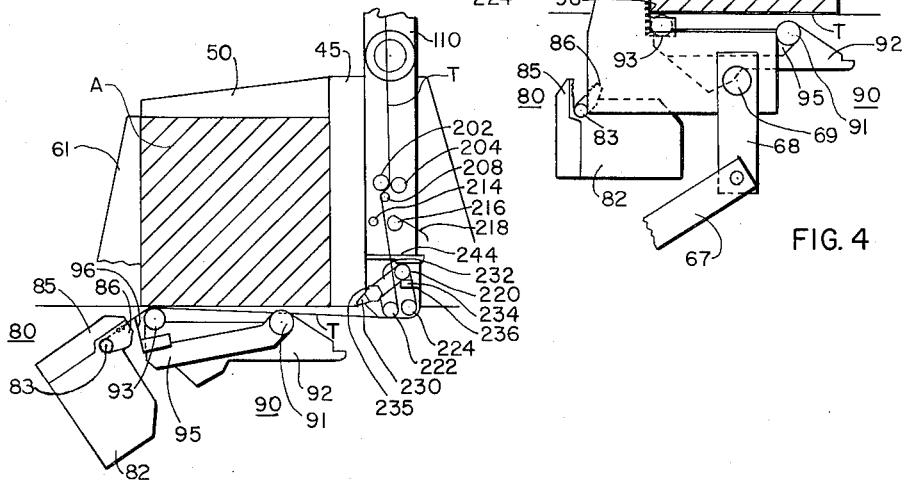

Dec. 26, 1961   J. A. POLSTER   3,014,322
WRAPPING MACHINE
Filed May 11, 1959   11 Sheets-Sheet 4

INVENTOR.
BY *John A. Polster*
*Carpenter, Abbott, Coulter & Kinney*

Dec. 26, 1961  J. A. POLSTER  3,014,322
WRAPPING MACHINE

Filed May 11, 1959  11 Sheets-Sheet 6

INVENTOR.
BY John A. Polster
Carpenter, Abbott, Coulter & Kinney

Dec. 26, 1961  J. A. POLSTER  3,014,322
WRAPPING MACHINE
Filed May 11, 1959  11 Sheets-Sheet 7

INVENTOR.
John A. Polster
BY
Carpenter, Abbott, Coulter & Kinney

Dec. 26, 1961  J. A. POLSTER  3,014,322
WRAPPING MACHINE

Filed May 11, 1959  11 Sheets-Sheet 8

INVENTOR.
John A. Polster
BY
Carpenter, Abbott, Coulter & Kinney

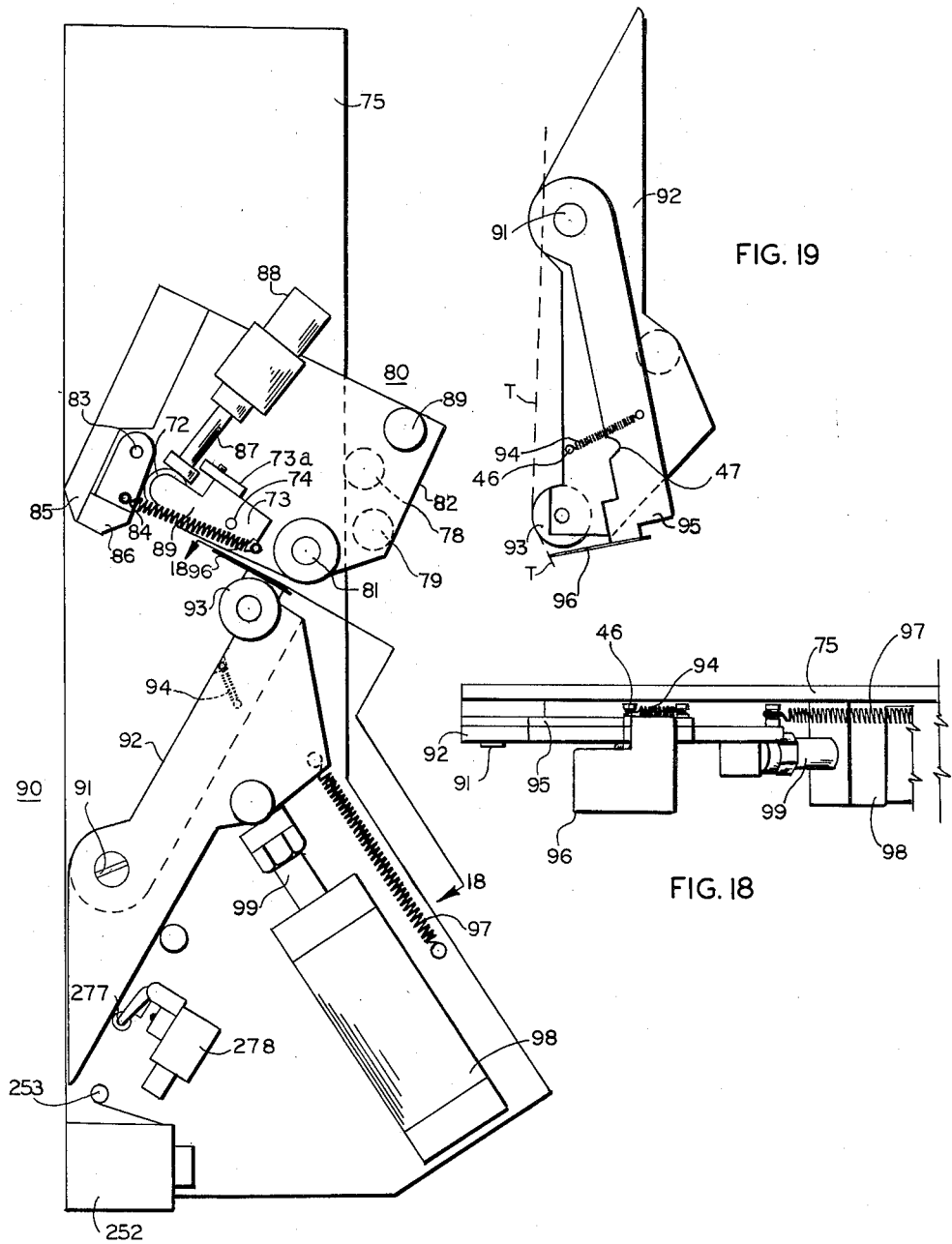

Dec. 26, 1961  J. A. POLSTER  3,014,322
WRAPPING MACHINE
Filed May 11, 1959  11 Sheets-Sheet 10
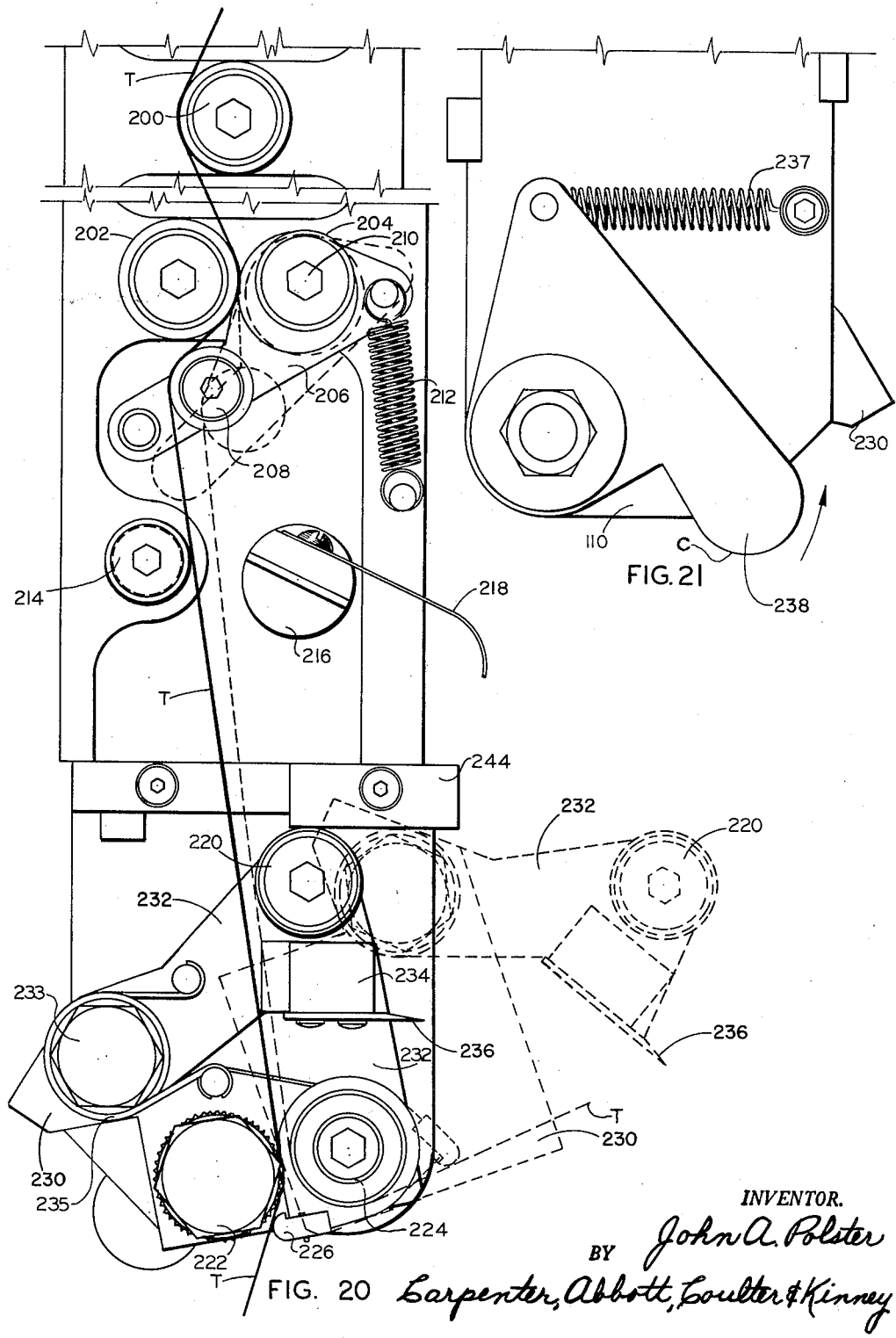
INVENTOR.
John A. Polster
BY Carpenter, Abbott, Coulter & Kinney Dec. 26, 1961 J. A. POLSTER 3,014,322
WRAPPING MACHINE
Filed May 11, 1959 11 Sheets-Sheet 11

INVENTOR.
John A. Polster
BY
Carpenter, Abbott, Coulter & Kinney

United States Patent Office 3,014,322
Patented Dec. 26, 1961

3,014,322
WRAPPING MACHINE
John A. Polster, St. Paul, Minn., assignor to Minnesota Mining and Manufacturing Company, St. Paul, Minn., a corporation of Delaware
Filed May 11, 1959, Ser. No. 812,271
18 Claims. (Cl. 53—198)

The present invention relates to a wrapping or taping machine of the type which acts to apply strip material, such as adhesive tape, to articles, such as cartons or boxes, to strengthen and seal them, or to wrap a number of separate articles to form them into a bundle.

A wrapping machine of the type to which this invention relates comprises a support for an article or articles to be wrapped, and a wrapping mechanism which acts to secure the free end of a supply of strip material to the article or articles, and to withdraw strip material from the supply and to apply it to the article or articles. The strip material used may be of any convenient width and type which the machine has been adapted to use. The embodiment shown in the attached drawings has been adapted to use pressure-sensitive adhesive tape which is up to one inch in width, and which has an adhesive coating on one side. This machine has been particularly adapted to wrap wooden boards together into a bundle, and for this purpose a filament reinforced tape is most advantageously employed, since this type of tape will withstand a considerable degree of linear force.

The wrap on a bundle of lumber will be made more secure if the wrapping material is applied while it is held under tension, so the embodiment shown in the attached drawings has been adapted to impart a considerable degree of tension to the tape as it is wrapped around an article. The wrap on such materials will also be more secure, and less tape will be necessary, if the tape is applied "straight" around the article; that is, so that the tape will be substantially equi-distant from an end of the article at all points around the periphery of the article. The embodiment shown in the attached drawings includes means for positioning and holding the article to accomplish this desired result. When wrapping loose articles, such as lumber, the wrap must continue until an overlap of tape has been formed, and an overlap of the tape will also act to strengthen the wrapping applied to a single article. Although a machine embodying the present invention may be adapted to wrap articles of various shapes, the embodiment depicted in the attached drawings has been adapted to wrap articles of square or rectangular cross-section and has particular advantage when wrapping articles of such configuration since the overlap is then accomplished around a corner of the article. By securing the free ends of the taping strip around the corner on such an article, the adhesive action of the tape, which resists the linear pull on the applied wrap, is increased due to the provision of an adhesive surface which is at right angles to the direction of the force of the linear pull.

In a machine as shown in the drawings, the free end of a supply of adhesive tape is first secured to two surfaces of an angular article, the bottom and the front, around a corner, and the wrapping mechanism acts to draw tape from the supply and to apply it to the article until it overlaps the end which was first applied to the article. The tape is then severed and the severed end is pressed against the back of the end at the front of the article; it is then pressed over the tape previously adhered to the bottom, to form an overlap around the corner, thereby providing a secure bond of tape around the article. A machine which employs the means of the present invention is able to provide an overlap in the wrap without the requirement of previous machines that the wrapping mechanism make two revolutions in providing an overlap and positioning itself for the next wrapping operation. After the article is wrapped by a machine of the present invention, the taping arm positions itself in its original or rest position, and positions the remaining tape so that it may again apply the tape to a bundle to be wrapped by a succeeding wrapping operation. The arm may do this either by returning to rest position by retracing the same path it took in wrapping, or, on the other hand, it may, with some modification, continue in its forward movement, to re-arrive at its rest position by forward movement alone; i.e. the arm makes a full cycle in the forward direction rather than traveling in a partially forward and partially reverse cycle as hereinafter more particularly explained.

In this type of wrapping machine it is desirable to guide the tape being applied to the bundle by passing it through a series of guiding rollers located both on the machine and on the taping arm. The tape guides which are located on the taping arm, from which the tape passes onto the article being wrapped, do not contact the bundle, but are maintained at a suitable distance from the article being wrapped. Previously, the result of such construction in a taping machine has caused a diminishing in the strength of the adhesive bond between the article wrapped and the tape applied thereto during the conclusion of the wrapping operation, i.e. between the time the tape is cut and the adhering of the cut end to the article. The present invention eliminates this difficulty, and provides greatly simplified and efficient means for securing, wrapping, severing and attaching the tape during the wrapping operation.

The "translational" movement of the taping arm of a machine of the present invention permits the article to be positioned for wrapping by moving the article into position from directly in front of the taping arm, rather than by moving it into position from the side of the taping arm, as has been previously necessary with the use of wrapping machines which employ a taping arm which is attached to the machine so that the arm is carried in a "rotational" movement. The advantage of this feature is apparent principally when a series of more than one machines of the present invention are used to wrap a long object, such as a bundle of lumber, with more than one wrapping of tape being applied around different points along the length of the bundle at the same time. As a result of the feature above referred to, the whole length of a bundle of lumber need not be run lengthwise through each machine but need only be moved the width of the bundle. This advantage not only saves time, but allows the use of a more compact conveyor system in conjunction with the machine.

The type of operation of a machine of the present invention also allows a single machine to be used to tape the sides of an enclosed frame (such as a window frame) by taping juxtaposed side members of several of such frames together, rather than having to tape across the entire width or length of such frames. In other words the present machine will tape through an aperture in an enclosed article to hold a plurality of such articles together by affixation merely of their "rim" portions.

The manner in which these and other objectives and advantages are attained by and in accordance with the present invention will be readily apparent from the following detailed description of an illustrative embodiment, especially in light of the accompanying drawings wherein like reference characters refer to corresponding parts in the several views, and in which:

FIGURE 3 is a schematic elevational view of the wrapping mechanisms of the machine from the same side as is shown in FIGURE 1, showing the position of those mechanisms at the start of the wrapping operation;

FIGURE 4 is a schematic elevational view of the wrapping mechanisms of the machine from the same side as is shown in FIGURE 1 showing the position of those mechanisms after the wrapping operation has started, showing in dotted lines, and once in solid lines, a number of successive positions assumed by the taping arm during a wrapping operation;

FIGURE 5 is a schematic elevational view of the wrapping mechanisms of the machine from the same side as is shown in FIGURE 1, showing the position of those mechanisms at the conclusion of the translational movement of the taping arm;

FIGURE 17 is a side elevational view of the traverse assembly as shown in FIGURE 16, showing the tape jaw and tacker assembly;

FIGURE 18 is a sectional view on line 18—18 of FIGURE 17;

FIGURE 19 is a side elevational view of the tacker assembly, showing the side of that assembly which is opposite to the side shown in FIGURE 17;

FIGURE 20 is a detailed side elevational view of the end of the taping arm, from the side of the machine shown in FIGURE 1, with dotted lines showing the extended position of the buffer plate and buffer plate arm;

FIGURE 21 is a detailed side elevational view of the other side of the end of the taping arm; i.e., the side opposite that shown in FIGURE 20;

Figure 1:
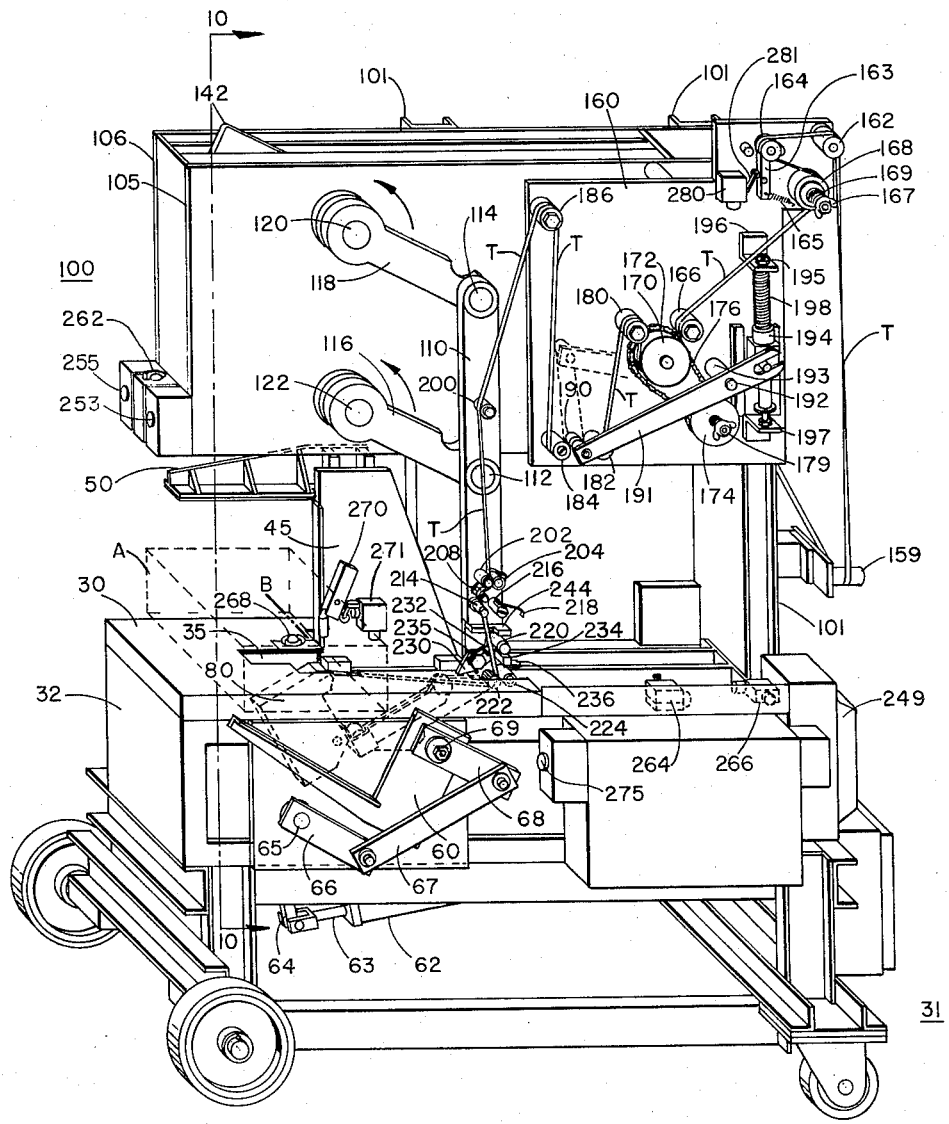
FIGURE 1 is a side isometric view of a wrapping machine embodying the present invention.
Figure 2:
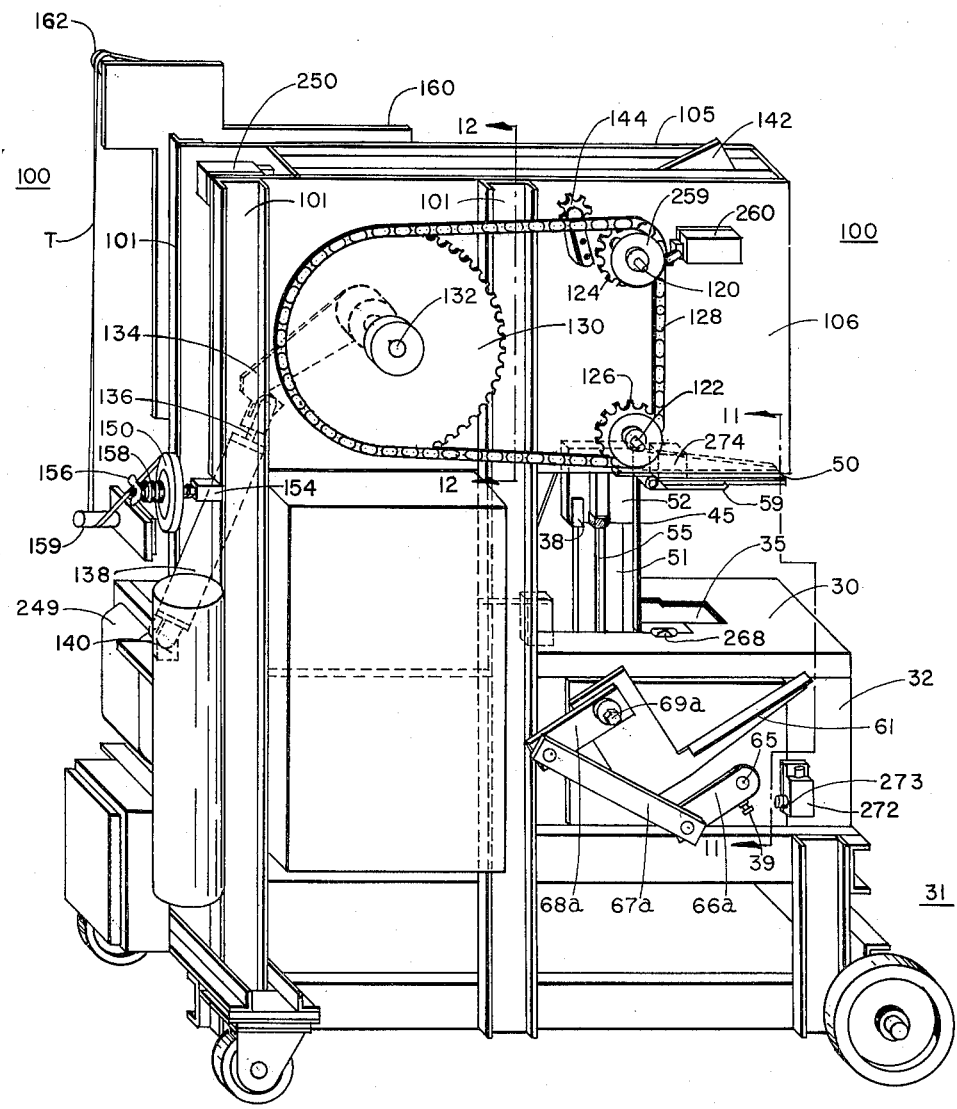
FIGURE 2 is an isometric view of the opposite side of the same machine.

The construction and operation of the machine will first be described in general, and then in detail. As shown in FIGURES 1 and 2, a machine embodying the present invention may comprise a frame which is provided with a platform for supporting an article to be wrapped by the machine. At the start of the wrapping operation the article is first positioned on said article support 30 so that the portion of its periphery, around which the tape is to be applied, is aligned with the tape; see article A, shown in dotted lines in FIGURE 1. The article is then clamped firmly in that position (in a manner to be hereinafter described) by action of the abutment plate 45, the vertical clamp 50 and the fences 60 and 61. The article, thus clamped in the machine, is then acted upon by the wrapping mechanism, which includes tape jaw assembly 80 (see FIGURE17; also shown in broken lines in FIGURE 1), tacker assembly 90 (with tacker face arm 95) and taping arm 110. Taping arm 110 is pivotally attached to two rotatable cranks 116 and 118 which act to transport the taping arm in a translational movement; i.e., movement in which all points on the taping arm have at any instant the same velocity and direction of motion, in contrast to or distinct from movement by rotation. Tape roll 150 is supported on the frame, and the free end of the tape is threaded through a series of guide rollers attached to the frame and to the taping arm, with the free end of the tape held in tape jaw assembly 80 with its adhesive side up, so that the tape is suspended beneath article support plate 30, laterally between taping arm 110 and tape jaw assembly 80.

Figure 6:
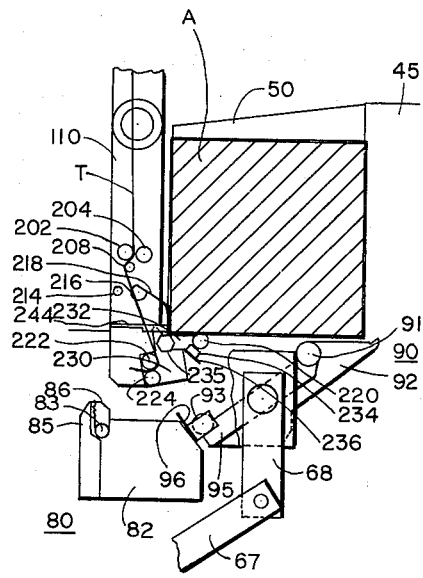
FIGURE 6 is a schematic elevational view of the wrapping mechanisms of the machine from the same side as is shown in FIGURE 1 showing the position of those mechanisms after the tape has been severed and the severed end has been buffed to the wrapped article.
Figure 8:
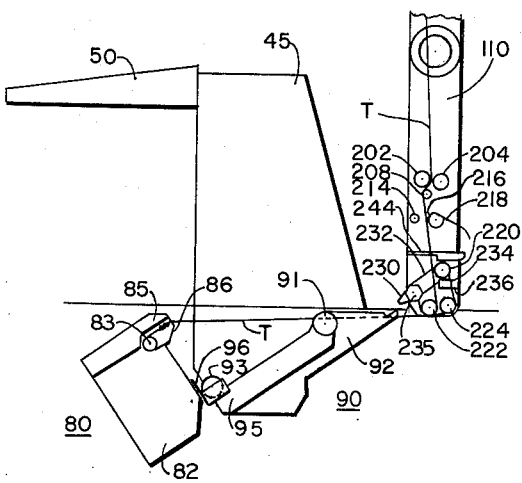
FIGURE 8 is a schematic elevational view of the wrapping mechanisms of the machine from the same side as is shown in FIGURE 1, showing the position of those mechanisms after they have been positioned in readiness for the next wrapping operation.
Figure 7:
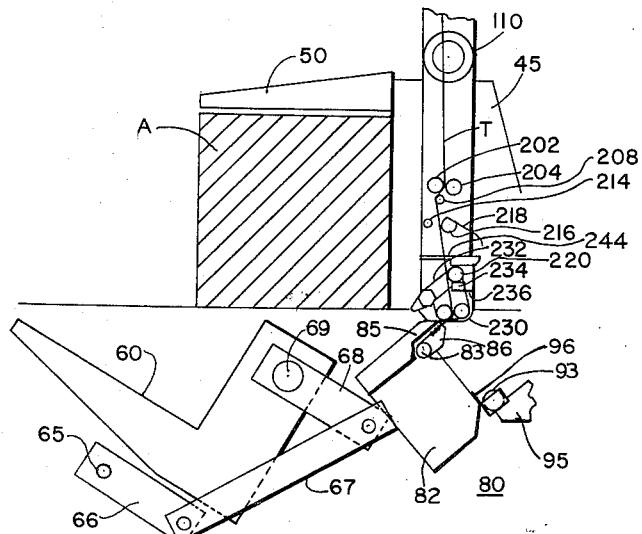
FIGURE 7 is a schmatic elevational view of the wrapping mechanisms of the machine from the same side as is shown in FIGURE 1, showing the position of those mechanisms after the taping arm has returned to its rest position and the other wrapping mechanisms have been moved toward it to obtain the tape in preparation for the successive wrapping operation.

At the beginning of the wrapping operation, tacker assembly 90 (with tacker face arm 95) moves upwardly and tacker roller 93 acts to adhesively attach the tape to the bottom of the article. Tape jaw assembly 80 then releases the tape, and tacker face arm 95 (see FIGURE 19) pivots upwardly to attach the leading end portion of tape against the front of the article by means of tacker face 96. Cranks 116 and 118 are then rotated, lifting the tape arm to translate it through the successive positions illustrated in FIGURES 3–5, thereby encircling the article with adhesive tape. FIGURE 6 shows the manner in which the tape is severed and the severed end is buffed to the article. FIGURES 7 and 8 show the manner in which the machine readies itself for wrapping of the next article. During the movement of the taping arm, as shown in FIGURES 3–5, tape tension brake 174 acts to retard movement of tape tension drum 170, thereby keeping the tape under a pre-set amount of tension. Spring-loaded tape take-up arm 191 acts to prevent slack from forming in the tape as the taping arm is translated around the article. The tension in the tape holds eccentric pinch stop 204 in its open position (as shown in broken lines in FIGURE 20), allowing the tape to move in either direction between said pinch stop and guide roller 202.

As the taping arm reaches the position shown in FIGURE 5, buffer spring 218 tacks the tape to the end of the tape which was first applied to the article (thus completing the encircling thereof). Tacker assembly 90, including tacker face arm 95 and tacker face 96 are then released and drop out of position, as shown in FIGURE 5. Buffer plate 230 (with attached buffer plate arm 232, carrying knife 236), then rotates as shown in FIGURE 6, and the movement of the knife against the tape, acts to sever it. The buffer plate continues its rotation and buffer arm roller 220 presses against the newly formed free tape end, causing it to adhere to the back of the tape which was previously applied about the lower front corner of the article. The sudden release in tension on the tape threaded in the machine, caused by the severing of the tape, allows pinch stop 204 to close, preventing the severed tape from backing through the taping arm, and maintaining the tape supply in position so that the free tip thereof will extend below the taping arm in position to be grasped by tape jaw 80 when the machine readies itself for the next wrapping operation.

The article is then released by the clamping mechanisms, which return to their rest positions. Buffer plate 230, with buffer arm 232, returns to its original position on the taping arm, and the cranks 116 and 118 are counter-rotated to return the taping arm to its original position. During the return of the taping arm, take-up arm 191 (the narrow end of which is free to move up and down) operates to keep slack from forming in the tape. As the taping arm is being returned, tape jaw 80 and tacker 90 move laterally, toward the normal or rest position of the taping arm as shown in FIGURE 7. The tape jaw, when in position as shown in FIGURE 7, tilts upwardly and opens so as to be in position to grasp the end of the tape extending below the taping arm. Clamps 85 and 86 on jaw 80 then close to grip the tape extending below the taping arm, and the tape jaw then returns to its original position (as shown in FIGURE 8), pulling tape through the machine to prepare for the next operation of the machine.

Figure 9:
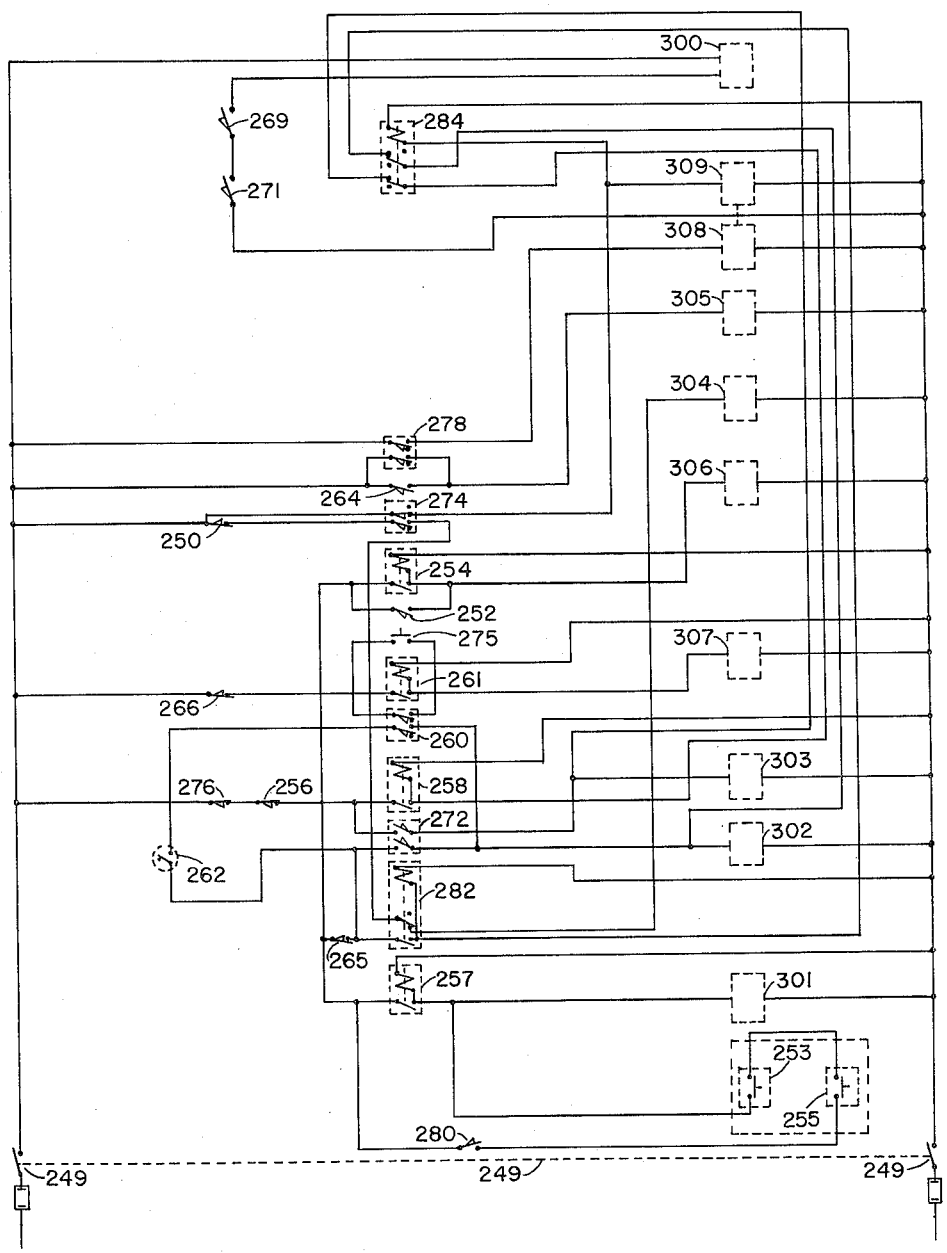
FIGURE 9 is a diagram of the electrical control system for the wrapping machine.
Figure 12:
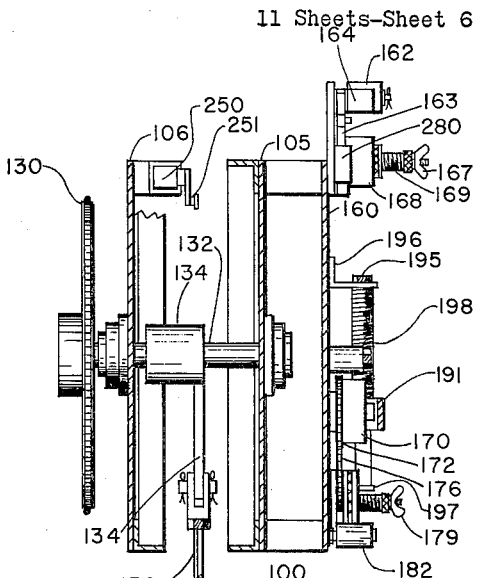
FIGURE 12 is a vertical sectional view on line 12—12 of FIGURE 2.

It will be apparent from the foregoing general description that the several devices which act on the tape during the course of the wrapping operation must be operated in a timed sequence. Such operation is obtained by the electrical control system which is illustrated schematically in FIGURE 9. The elements shown in FIGURE 9 are conventional limit switches and relays, and act to energize or de-energize the solenoids shown, which solenoids operate valves controlling a supply of air to air cylinders, which in turn act to operate parts of the machine. The abutment plate cylinder 48 is controlled by solenoids 300 and 302, and the drive cylinder 138 is controlled by solenoids 308 and 309. The other air cylinders are controlled by a single solenoid each, as hereinafter explained.

A source of compressed air (preferably under pressure of about 80 pounds per square inch) is contained in a reservoir (not shown) and it should be understood that the machine incorporates suitable air supply lines from said reservoir to the operating air cylinders. All of the air cylinders are of the double-acting type, except those which operate the tape jaw 80 and the tacker 90, which are single acting cylinders, the pistons of which are spring returned. The air valve controlling the air supply to the tape jaw cylinder 88 is of the conventional type which is normally open; i.e., in its normal position it allows air to flow into the cylinder unless acted upon by solenoid 305. The valves controlling the double-acting air cylinders are conventional four-way valves. A full description of the control system will be given as part of the following detailed description of the embodiment of the invention which is illustrated in the accompanying drawings.

Referring to FIGURES 1 and 2, it will be seen that a wrapping machine embodying the present invention comprises two general sections; namely, a lower section indicated generally by reference character 31, and an upper section indicated generally by reference character 100. The said upper section is supported above lower section 31 by vertical supports 101.

Figure 10:
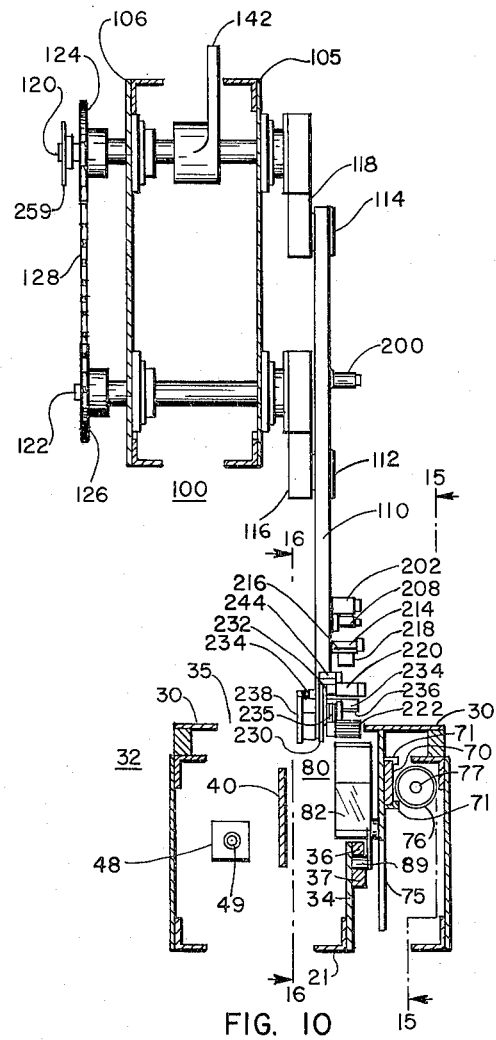
FIGURE 10 is a vertical sectional view on line 10—10 of FIGURE 1.

Lower section 31 includes a rectangular steel box 32 of which article support plate 30 forms the top. Article support plate 30 contains an opening 35 extending along its center, and beneath that opening, inside the said rectangular steel box 32 of which article support plate 30 forms the top. Article support plate 30 contains an opening 35 extending along its center, and beneath that opening, inside the said rectangular box 32, are two horizontal slide plates 40 and 70 (see FIGURES 10 and 11), which are attached to and supported by said box 32. Abutment plate 45 is slidably hung, by means of flanges 41, on horizontal slide plate 40, so that said abutment plate 45 is movable in a lateral direction along the slide plate 40. Such lateral movement is accomplished through the action of the abutment air cylinder 48, the piston rod 49 of which is attached to said abutment plate.

Figure 11:
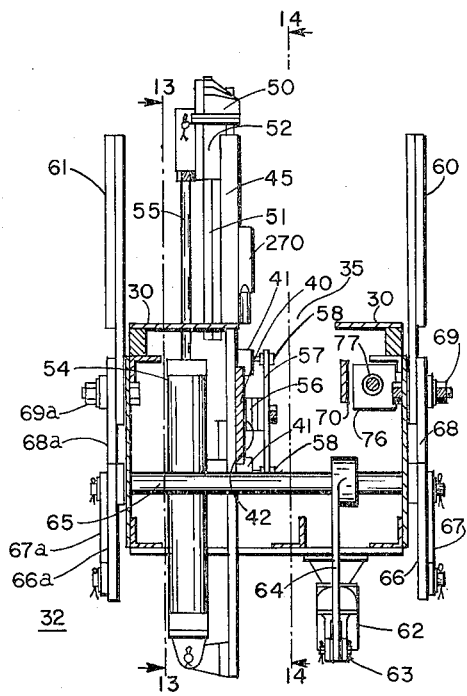
FIGURE 11 is a vertical sectional view on line 11—11 of FIGURE 2.
Figure 13:
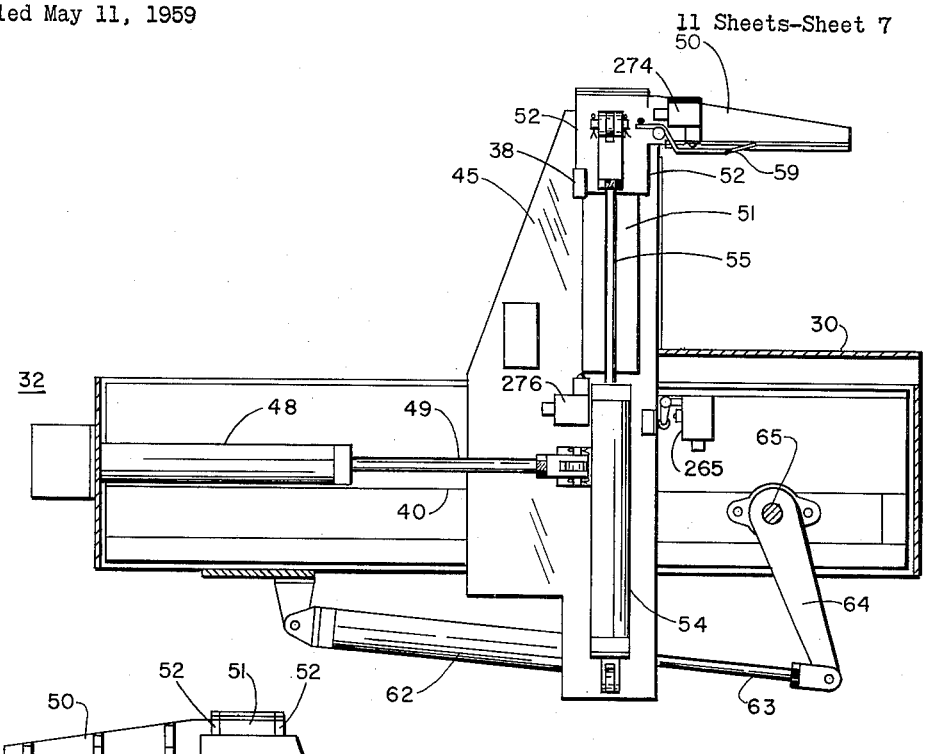
FIGURE 13 is a longitudinal sectional view taken through the lower section of the machine along line 13—13 of FIGURE 11, showing the abutment plate and vertical clamp from the side of the machine shown in FIGURE 2, but with the fence 60 removed, for clarity.

As shown in FIGURES 11 and 13, abutment plate 45 supports vertical clamp 50, the edges 52 of which are flanged about vertical slide plate 51 (which is spaced away a short distance from the abutment plate) so that the vertical clamp 50 is movable in a vertical direction. This movement is accomplished by action of the vertical clamp air cylinder 54, the piston rod 55 of which is attached to the vertical clamp 50.

Figure 14:
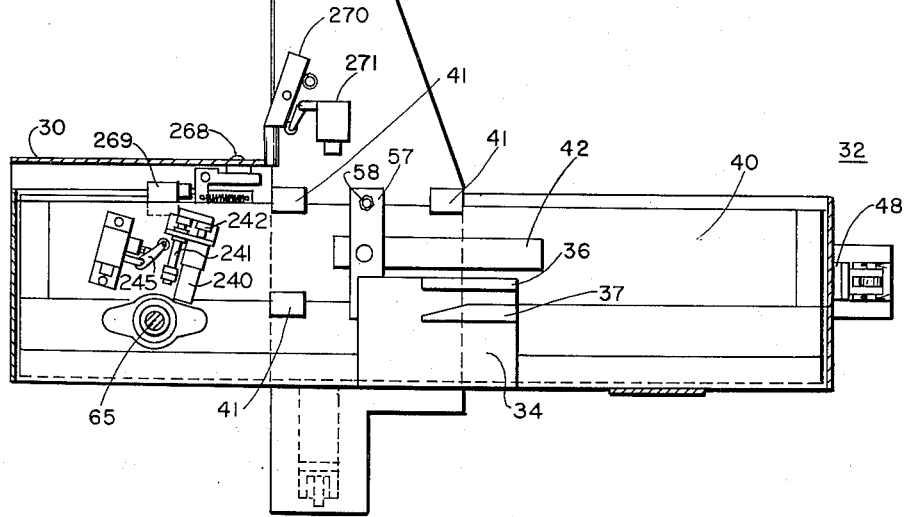
FIGURE 14 is a longitudinal sectional view taken through the lower section of the machine along the line 14—14 of FIGURE 11, showing the abutment plate and vertical clamp from the side of the machine shown in FIGURE 1, but with the fence 61 removed, for clarity.

At the beginning of the operation of the machine, double-pole fused disconnect switch 249 is closed, providing electric power to the machine. When operation begins abutment plate 45 (along with vertical clamp 50, etc.) is positioned with rod 49 in extended position; i.e. the abutment plate is positioned toward the front of the machine as shown in FIGURE 1. The article to be taped, A, is placed on article support 30 and pushed forward against abutment plate 45. Normally open limit switch 271 is located on the side of abutment plate and its actuator 270 is positioned so that it extends slightly beyond the face of the abutment plate 45. A second normally open limit switch 269 is located under article support plate 30 with the actuator 268 for said switch projecting up from the face of said plate immediately in front of the reference line B. Reference line B defines the place at which the outermost face of the article A must be in order to permit the machine to operate properly. The pressure of the article against actuator 270, and the weight of the article upon actuator 268, act to depress both of these elements and operate the switches which they control; namely switches 269 and 271: see FIGURE 9. The simultaneous closing of both of these switches energizes solenoid 300, which in turn opens a conventional air valve to permit air to enter the retract side of abutment cylinder 48, to move abutment plate 45 toward the rear of the machine. The rearward motion of the abutment plate will continue while both of the switches 269 and 271 are closed, but as the outermost edge of the article is pushed past the actuator 268, the switch 269 will open, thereby de-energizing solenoid 300 to cut off entry of air into abutment cylinder 48. The abutment plate then stops its rearward motion. The article is thus positioned on the machine slightly to the rear of reference line B. To prevent further rearward movement of abutment plate 45, a friction pad 56, attached to spring bar 57 (in turn attached to abutment plate 45), has been set, by turning screws 58, to bear against bearing plate 42 which is affixed to horizontal slide plate 40, thereby preventing any easy movement of abutment plate 45 along the horizontal slide plate 40: see FIGURES 11 and 14.

The article is then clamped into position by the action of the operator pushing the starting switches 253 and 255, which switches are located on what will be referred to as the front of the machine. Those switches act to close the normally open single-pole single-throw relay 257, thereby energizing solenoid 301, and opening the air line to the drive side of fence cylinder 62, the piston rod 63 of which will then extend to raise each of the fences 60 and 61 simultaneously, by reason of the construction hereafter referred to. Arm 64 is attached to piston rod 63 and fence axle 65 and will cause said axle to rotate with inward or outward movement of said piston rod. One end of crank member 66, or the bell-crank linkage composed of members 66, 67 and 68, is attached to fence axle 65, and the rotation of that axle causes these pivotally connected members to move together. The crank element 68 is affixed to fence 60 so that the rotation of fence axle 65 causes fence 60 to pivot on the bolt 69, which bolt serves to pivotally attach fence 60 to the side of box 32. This action causes the arms of the fences 60 and 61 to move upwardly into position, so that their surfaces lying toward the back of the machine (which surfaces bear against, and hold article A during the wrapping operation) are flush with, and are located at opposite ends of, reference line B. Thus, when abutment plate 45 is caused to come forwardly, in the manner hereinafter described, article A will be held, on article support plate 30, in precise position to be acted upon by the wrapping mechanism. As shown in FIGURE 2, an identical bell-crank linkage composed of elements 66a–69a is mounted on the other side of the machine.

When fences 60 and 61 reach their upright position, projection 39 on connecting member 66a bears against actuator 273 which acts to close the normally open double-pole double-throw limit switch 272. The closing of switch 272 energizes solenoids 302 and 303 through the closing of relays 282 and 258. The closing of said relays is accomplished by means of a hold-in circuit; i.e. a circuit in which a relay may be closed by a momentary closing of an energizing switch, which relay will remain closed, even though the energizing switch is subsequently opened, until the circuit is broken by opening another normally closed de-energizing switch. Relay 284, in this hold-in circuit, acts as an interlock switch with the energizing switch 272, and permits the closing of relays 282 and 258 since it is closed while the solenoid 309 is energized and is open when solenoid 309 is de-energized. Solenoid 309 operates the retract side of the drive cylinder 138, and is energized at this time, but is subsequently de-energized, as will be described below.

The energizing of solenoid 302 operates a valve to permit air to enter the drive side of abutment plate cylinder 48 and the energizing of solenoid 303 operates the valve associated with vertical clamp cylinder 54 to permit air to enter the drive side of said cylinder. The air in cylinders 48 and 54 causes vertical clamp 50 and abutment plate 45 to move toward article A, forcing the article forwardly against the fences 60 and 61 and downwardly against article support plate 30.

Actuator 59 for double-pole double-throw switch 274 is located so that it protrudes slightly beyond the lower face of vertical clamp 50. As shown in the diagram of FIGURE 9, switch 274 has a normally closed and a normally open side; the normally open side of this switch is closed, and the normally closed side thereof is opened, by the contact between actuator 59 and article A. On the normally closed side, switch 274, when it opens that side, acts to de-energize solenoid 309, which controls the retract side of the double solenoid valve controlled by solenoids 308 and 309, which valve controls the air supply to cylinder 138, which cylinder operates to drive taping arm 110. The de-energizing of solenoid 309 does not shift the valve, but allows the subsequent operation of solenoid 308, which controls the drive side of the double solenoid valve controlled by solenoids 308 and 309. The opening of the normally closed side of switch 274 also opens relay 284. The opening of relay 284 allows the subsequent breaking of the hold-in circuit which controls relays 282 and 258, although the switch 272 is held closed by fences 60 and 61. The opening of relay 284 also permits the normally open side of switch 274, when that side closes, to energize the solenoid 304, through the normally closed side of relay 282. The energizing of solenoid 304 shifts the valve on tacker cylinder 92 into drive position, so that tacker assembly 90 will operate.

If no article is present in the machine for wrapping (i.e. if actuator 59 is not depressed), vertical clamp 50 will move downwardly until actuator 38 on abutment plate 45 contacts switch 276. Such contact will open normally closed limit switch 276, which will result in the de-energizing of all relays and circuits which have previously been actuated, to return the machine to rest position. If the switch 274 is actuated by the presence of an article to be wrapped by the machine, the tacking phase of the wrapping operation will begin.

The components of the jaw assembly and the tacking assembly and operation thereof are as follows: horizontal slide plate 70 supports traverse plate 75 which is movable in the lateral direction on the sliding retainers 71, which ride on opposed edges of horizontal slide plate 70. The traverse plate 75 is moved laterally by action of air entering traverse cylinder 76, which in turn moves traverse piston rod 77. Tape jaw assembly 80 is pivotally attached to traverse plate 75 by jaw pin 81, and tacker assembly 90 is pivotally attached to traverse plate 75 by the tacker pin 91.

Figure 16:
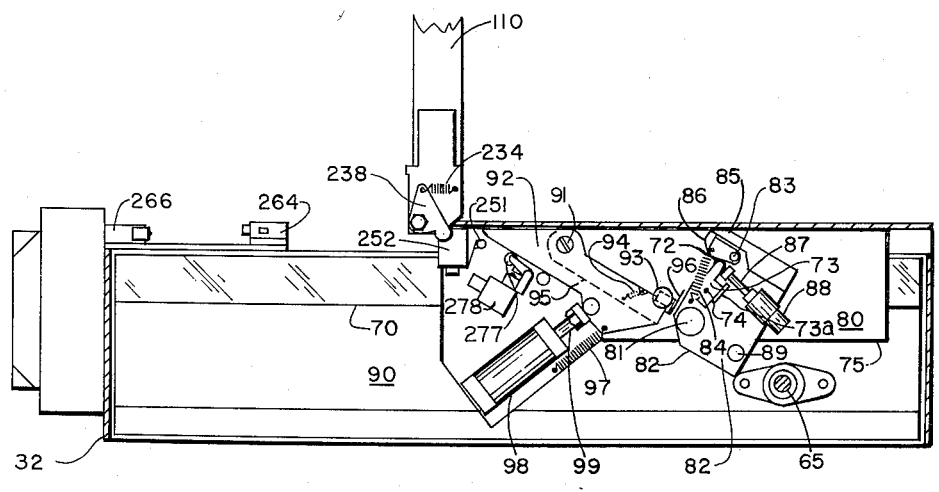
FIGURE 16 is a longitudinal sectional view taken through the lower section of the machine along line 16—16 of FIGURE 10, showing the traverse assembly from the side of the machine shown in FIGURE 2.

As shown particularly in FIGURES 16 and 17, tape jaw assembly 80 is composed of tape jaw plate 82, to which is attached fixed claw 85. Movable claw 86 is also attached to jaw plate 82, and is positioned adjacent to claw 85. Claws 85 and 86 cooperate, in the manner hereinafter described, to form the tape jaw proper; i.e. the mechanism which actually grasps the tape. Claw 86 is pivoted on claw pin 83, which is attached to plate 82. Claw 86 is normally urged away from claw 85 by action of jaw spring 84, which is attached at one end to claw 86 and at its other end to plate 82. Claw 86 is moved toward claw 85 by the driving force of piston rod 87, which bears against wedging roller 72 on wedging arm 73. Wedging arm 73 is pivotally attached, at point 74, to jaw plate 82, so that roller 72 bears against the inclined back of claw 86. The action of piston rod 87 against roller 72 forces that roller up the incline on claw 86, pivoting the wedging arm 73 and moving claw 86 toward claw 85, against the action of spring 84. Wedging arm pawl 73a is attached to wedging arm 73 and protrudes so that its tip extends behind the head of piston rod 87. Piston rod 87 in jaw cylinder 88 is spring-returned, and when it is allowed to return, the head of piston rod 87 contacts pawl 73a moving wedging arm 73 toward the piston rod 87. The roller returns along the incline of claw 86, allowing spring 84 to force the two claws apart, opening the jaw.

The entire tape jaw assembly 80 is moved to the tilted position shown in FIGURES 8 and 17 by action of tape jaw cam follower 89, which is attached to tape jaw plate 82. As traverse plate 75 is caused to move laterally toward the rear of the machine, jaw cam follower 89, which is a generally cylindrical member projecting from the face of the jaw plate 82, slides between cam tracks 36 and 37 (see FIGURE 14) on tape jaw cam plate 34, which is attached to box 32. Tape jaw 80 is caused to tilt upwardly by the action, on cam 89, of the incline of cam track 37 on cam follower 89: see FIGURE 10. As has previously been set out, claw 86, at the same time that assembly 80 is caused to tilt, is forced toward claw 85, and the free end of the tape is grasped between said claws. As long as said claws remain closed on the tape, the lineal strength of the tape holds the tape jaw in its tilted position, irrespective of the fact that cam follower 89 is subsequently disengaged from cam tracks 36 and 37.

Figure 15:
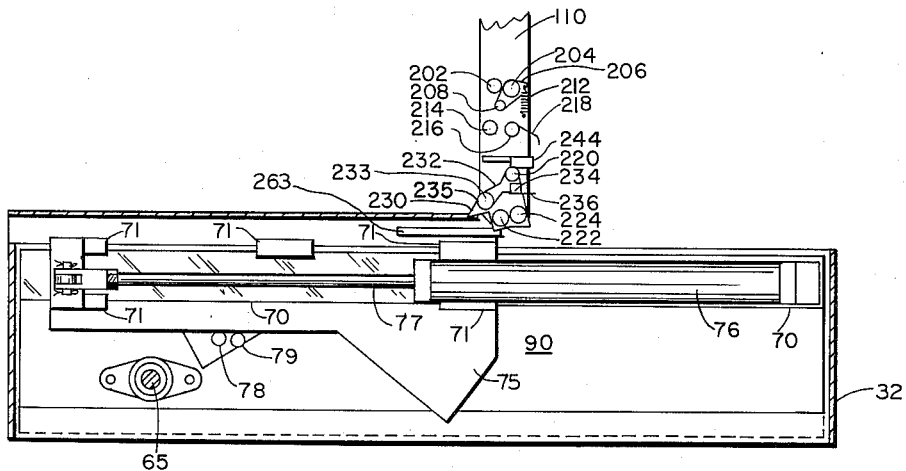
FIGURE 15 is a longitudinal sectional view taken through the lower section of the machine along line 15—15 of FIGURE 10, showing the traverse assembly from the side of the machine shown in FIGURE 1.

The pivotal movement of tape jaw 80, about pin 81, as above described, is limited by stops 78 and 79, attached to jaw plate 82 on the side opposite the clamp 86: see FIGURE 15. Stop 78 is positioned to bear against the traverse plate 75 and prohibits the upward movement of the tape jaw beyond the tilted position of the tape jaw, as shown in FIGURE 17. Stop 79 is positioned to bear against the traverse plate 75 and prohibits the downward movement of the tape jaw, beyond its horizontal position, as shown in FIGURE 5.

The tacker assembly 90 is composed of tacker plate 92 (carrying tacker roller 93), and tacker face arm 95 (carrying tacker face 96), all of which are pivotally attached to traverse plate 75 by tacker pin 91: see FIGURES 17, 18 and 19. Tacker air cylinder 98 is affixed to traverse plate 75, and operates to force piston rod 99 against tacker plate 92, forcing said plate and tacker roller 93 (attached thereto) upward as the tacker assembly pivots on tacker pin 91. This upward movement of the tacker assembly continues until the tacker roller 93 bears against the bottom of the article A to press tape T against the bottom of said article. Tacker face 96 is attached to the end of tacker face arm 95, and extends laterally and then upwardly therefrom, at right angles, to occupy a vertical position in front of tacker roller 93. The tacker face arm 95 is connected to the tacker plate 92 by spring 94 which urges said parts together so that the tacker face 96 normally extends upward beyond the tacker roller 93. Tacker face arm 95 is prevented from moving upward beyond tacker plate 92 by spring pin 46, which is attached to the tacker plate 92, and which is contacted in the recess 47 in the tacker face arm 95. Piston rod 99 bears only against tacker plate 92, but both the tacker plate 92 and the tacker face arm 95 are normally moved together, due to the action of the spring 94. Both the tacker plate 92 and the tacker face arm 95 are normally held in the downward position by action of the tacker spring 97, which is attached at one end to the tacker plate 92 and at the other end to the traverse plate 75.

The tacking phase begins with the free end of the tape T held between the tape claws 85 and 86, with the tape T held suspended under the article A, with its adhesive side facing upward.

The valve on the single acting tacker cylinder 98 having been opened (by solenoid 304 as hereinabove referred to), air entering said cylinder causes piston rod 99 to move outward, striking tacker plate 92 and pivoting the tacker assembly 90 upward. The tacker roller 93 then strikes the back of the tape T, moving the tape upward toward, and into contact with, the bottom of the article A. Tacker face arm 95 is carried upward with plate 92 due to spring 94 which connects it to said plate 92. However, the leading, uppermost, edge of tacker face 96 will strike tape T and thus be prevented from moving upward beyond the plane of said tape, which is held under tension. The fact that further upward movement of tacker face 96 is impeded by the tape, results in said tacker face arm 95 and tacker plate 92 being spread apart scissors-like, against the tension of the spring 94: see FIGURE 19. The force of the piston rod 99 is sufficient to drive plate 92 and roller 93 upward against article A despite the tension in the interposed tape, but the tacker face arm 95, which is urged upwardly only by spring 94, lags behind the tacker roller 93.

As tacker roller 93 forces the adhesive side of the tape against the bottom of the article, the rear edge of the tacker plate 92 operates actuator 277, which is located on the traverse plate 75, and actuator 277 acts to close the normally open double-pole double-throw limit switch 278. One side of the switch 278 acts to close the normally open limit switch 264, which action shifts the solenoid 305 to operate a valve in the circuit which will allow air to escape from cylinder 88. This will permit tape jaw piston rod 87 to return into said cylinder, and claws 85 and 86 thereby to open, releasing the tape. Since tape jaw 80 has been held in its tilted position by the tape, said jaw drops downward to its horizontal position when it releases the tape. The release of the tape by tape jaw 80 allows tacker face arm 95 to move upward, by action of the spring 94. The tape end which was held in tape jaw 80 is then carried upward by the tacker face 96, and is pressed by it against the front of the article. The closing of the other side of switch 278 initiates the taping phase of the wrapping operation by causing solenoid 308 to operate to let pressurized air into the drive side of cylinder 138 for taping arm 110.

Taping arm 110 is pivotally attached by pins 112 and 114 to the ends of rotatable cranks 116 and 118, which cranks are affixed, at their other ends, to axles 120 and 122. The simultaneous rotation of axles 120 and 122 acts to rotate cranks 116 and 118, thereby transporting taping arm 110 in a translational movement. When the machine is viewed as in FIGURE 1, the movement of taping arm 110 is in counter-clockwise direction, during the wrapping operation, and in clockwise direction during return of the taping arm to its rest position. Axles 120 and 122 are journaled through support plates 105 and 106. Axles 120 and 122 are rotated by the action of sprockets 124 and 126, affixed thereto. Sprockets 124 and 126 are turned by chain 128, which is moved by the rotation of drive sprocket 130. Drive sprocket 130 is mounted on drive axle 132, which is journaled through support plates 105 and 106. Drive crank 134 is attached to drive axle 132 and is moved upward and downward by drive cylinder piston rod 136 which is acted upon by drive cylinder 138. Drive cylinder 138 is pivotally attached in the bracket 140 located on box 32. The drive cylinder 138 is an air cylinder, to either end of which air may be admitted, to drive the piston rod 136 in either direction. Drive sprocket 130 has a circumference of approximately 3 times that of sprockets 124 and 126, so that movement of drive crank 134 through an angle of approximately 90° will result in movement of cranks 116 and 118 through approximately 270° of rotation. The weight of the taping arm 110 and the cranks 116 and 118 is compensated for by counter-weight 142 which is affixed to the axle 120. An adjustable idler sprocket 144 is movably attached to the support plate 106 and contacts the chain 128, and said sprocket 144 may be manually adjusted to control the tension in the drive chain 128.

A roll of adhesive tape 150, is mounted on a drum, which drum is in turn rotatably mounted on shaft-bearing bracket 154. The shaft on said bracket 154 is threaded at its outer end to receive tape roll braking nut 156. Tape roll spring 158 is mounted on said shaft between tape roll 150 and tape roll braking nut 156, so that by manually turning the nut 156, to move it inwardly toward tape roll 150, pressure is applied against said tape roll by spring 158. This pressure acts to retard rotation of the tape roll, thereby retarding removal from the roll of more tape than is needed for operation of the machine.

The tape T, from the tape roll 150, is threaded into the machine by passing the uncoated side over the adjustable roller guide 159. The uncoated side of the tape is then threaded around roller guides 162 and 164, which are attached to tape roller guide plate 160. Tape roller guide plate 160 is mounted in spaced relation to, and is attached to, the upper support plate 105.

After passing over the roller 164, the tape passes around the roller guide 168, with the coated side of the tape contacting that roller. In order to minimize the adherence of the adhesive to the face of roller 168, a plastic covering is preferably used on the face of this roller. Also, in order to provide a balance in the tensioning force operating on the tape, the rotation of roller 168 is retarded by action of the nut 167 against the spring 169. Roller 164, located between rollers 162 and 168, is mounted on arm 163 which is pivotally mounted on guide plate 160 and is urged by spring 165 toward actuator 281 for switch 280, which switch is held closed by the action of said roller as long as there is tension in the tape between the rollers 162 and 168. The switch 280 opens if the roller 164 is moved forward by spring 165; i.e. when tension in the tape is relieved between the rollers 162 and 168 because the tape supply roll 150 is exhausted. The purpose of this arrangement is to prevent the machine from starting another complete taping operation when the tape supply has been exhausted. However, switch 280 will not prevent the completion of a taping operation which is in the process of being performed at the time said switch is actuated.

After passing over the roller guide 168, the tape proceeds over roller guide 166, with the uncoated side of the tape contacting that roller, and next the tape is threaded around tape tension drum 170, with the adhesive face of the tape in contact with the drum. The circumference of the drum is knurled, in order to present less surface area to the adhesive and thus facilitate the release of the tape from the drum. A sprocket 172 is affixed to drum 170 and movement of the drum is controlled by tape tension brake 174, through the tape tension chain 176. The brake 174 is composed of a sprocket with fiber material on each of its faces. By tightening the nut 179, the brake is moved toward the plate 160, squeezing the fiber material against the plate, thereby increasing the force required to turn brake 174, likewise, increasing the force required to turn drum 170. The action of the brake mechanism permits regulation of the amount of tension which is put on the tape during the wrapping operation.

The tape next passes over the roller guide 180, with the non-adhesive back of the tape contacting that roller, and the adhesive face of the tape then contacts the guide rollers 182 and 184. In order to minimize the adherence of the adhesive coating to the rollers 182 and 184, these rollers are covered with silicone rubber sleeves, since silicone rubber has low adherence to a pressure-sensitive adhesive.

Between the rollers 182 and 184 is take-up guide roller 190, which contacts the non-adhesive back side of the tape. Take-up guide roller 190 is not attached directly to tape guide plate 160, but is affixed to the unsupported free end of tape take-up arm 191. Tape take-up arm 191 is pivotally attached to tape guide plate 160 by bolt 192, threaded into guide plate 160. Hub 193 projects from the rear surface of take-up arm 191, so that take-up arm 191 will be spaced away from tape guide plate 160. The end of take-up arm 191 which is remote from guide roller 190 is pivotally attached to take-up bearing 194 and take-up bearing 194 is in turn movably attached onto the take-up rod 195. Take-up rod 195 is attached to the tape guide plate 160 by the brackets 196 and 197. As shown in FIGURE 1, take-up plate 194 is urged in the downward direction by the action of take-up spring 198. This causes take-up arm 191 to pivot on bolt 192, urging the guide roller 190 into its upward position; i.e., closer to the top of the machine than the position it has in FIGURE 1. When the machine has been properly prepared for operation, take-up roller 190 will begin the wrapping operation in the downward position as shown in FIGURE 1. The action of the take-up mechanism just described will move the roller 190 toward its upper position during the wrapping operation when it is necessary to take up slack and keep tension on the tape.

After the tape passes over the guide roller 184, it is threaded so that the back of the tape contacts and passes over the guide roller 186, the last of the series of rollers which are attached to tape guide plate 160. The tape then passes to the taping arm 110.

As the tape extends down taping arm 110, the back of the tape passes over tape guide roller 200 (see FIGURE 20), and then passes between the guide roller 202 and pinch stop 204. Pinch stop 204 does not revolve, and is eccentrically mounted on pinch plate 206. Rotatable pinch plate roller 208 is also mounted on pinch plate 206. The pinch plate 206 is pivotally attached to taping arm 110 by pinch pin 210, and pinch pin 210 is positioned so that upward pivotal movement of pinch plate 206 moves eccentric pinch stop 204 into contact with guide roller 202. Pinch spring 212 is attached to pinch plate 206 and to taping arm 110, and acts to urge pinch plate 206 upwardly toward guide roller 202, holding eccentric pinch stop 204 against guide roller 202, closing the space between said roller 202 and pinch stop 204. This action serves to pinch the tape between the guide roller 202 and the pinch stop 204, preventing the tape from moving between them (as is shown in solid lines in FIGURE 20).

However, when tension is applied to the tape, as when taping arm 110 begins the wrapping operation, the tape will bear more forcibly against pinch plate roller 208, causing the pinch plate 206 to pivot, moving the pinch stop 204 away from the guide roller 202, against the action of the spring 212, and the tape will be allowed to move between the roller 202 and the pinch stop 204 (as shown in dotted lines in FIGURE 20).

From the pinch plate guide 208, the tape is threaded between the tape guide roller 214 and the fixed support post 216, which are spaced apart from each other. Buffer spring 218 is attached at one of its ends to support post 216 and extends outward and downward beyond the side of taping arm 110, as shown in FIGURE 20. The tape then passes the buffer arm roller 220, is threaded between the terminal tape guide rollers 222 and 224 and then proceeds forward to be held in claws 85 and 86 of the tape jaw assembly 80 as described above. Terminal tape guide roller 222 is preferably knurled, since it contacts the adhesive face of the tape and it is desirable to reduce the roller face area which contacts the adhesive. Torsion spring arm 226 (see FIGURE 22) is attached to tape roller guide 224, and extends outward along the axis of that roller. Spring arm 226 is biased by torsion spring 228 so that the torsion spring arm 226 is urged in a clockwise direction (as shown in FIGURE 20) toward terminal guide roller 222. Torsion spring arm 226 serves to urge the severed end of the tape toward the front of the machine, so that it may be more easily grabbed by the claws of the tape jaw, at the appropriate time.

Figure 22:
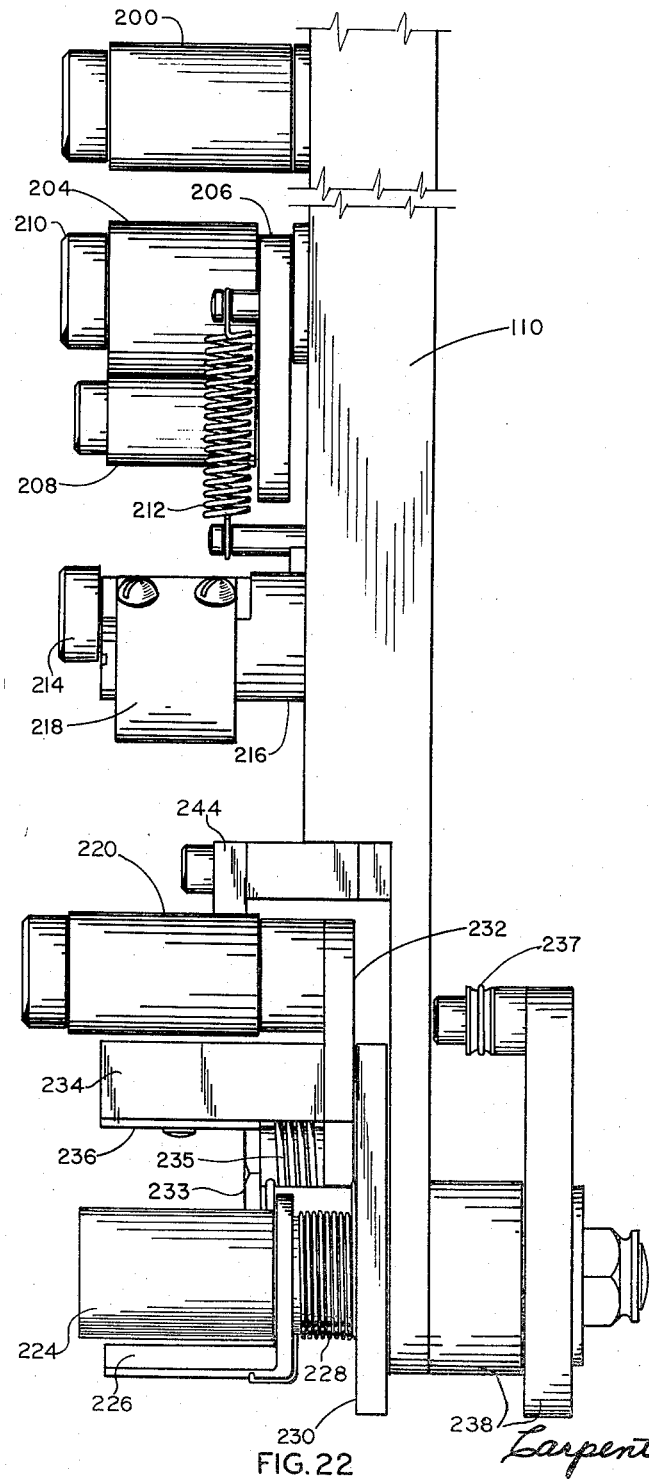
FIGURE 22 is a detailed elevational view of the end of the taping arm, from the rear of the machine, the end toward the right as the machine is viewed in FIGURE 1.

As shown in FIGURES 20, 21 and 22, buffer plate 230 is pivotally attached on taping arm 110 at the center of the terminal roller guide 224. Buffer plate 230 forms a part of taping arm 110, and has attached to it buffer arm 232, with buffer arm roller 220 and knife 236 affixed on knife plate 234. Knife 236 preferably has a serrated edge and is affixed by plate 234, to buffer arm 232. Buffer arm 232, with buffer arm roller 220 and knife 236 is pivotally attached to buffer plate 230 at the center of stub shaft 233.

Buffer plate 230 is spring biased into its position as shown in solid lines in FIGURE 20, by buffer plate spring 237, and functions by reason of its rotation in a clockwise direction, about the pivot point of roller 224. Such rotation is accomplished through the action of buffer crank 238 which is turned by action of buffer cylinder 240 through movement of the buffer piston rod 242. Cylinder 240 is mounted on horizontal slide plate 40 (see FIGURE 14) so that its piston rod 242 will operate on point C (approximately) of crank 238: see FIGURE 21. Buffer crank 238 is located on the rear of taping arm 110, and is affixed to the buffer plate 230 through the taping arm (see FIGURE 22) so that the buffer plate will turn when the crank turns.

The rotation of buffer plate 230 in the clockwise direction moves the buffer arm 232 and knife 236 in that direction, forcing knife 236 against the tape, severing it. The further rotation of the buffer plate 230 moves the buffer arm roller 220 against the newly severed end of the tape and rolls it against the bottom of the article.

Buffer arm 232 is pivotally attached to buffer plate 230 by stub shaft 233, and is urged in the counterclockwise direction by the spring 235, so that when the buffer plate 230 is rotated in a clockwise direction, the buffer arm roller 220, located on the free end of the buffer arm 232, moves to the position shown in dotted lines in FIGURE 20. When the buffer plate 230 returns to the taping arm 110 as shown in solid lines in FIGURE 20, buffer roller 220 is forced against cam 244, compressing the spring 235. Said spring will remain under tension while arm 232 is in position shown in solid lines in FIGURE 20.

As previously mentioned, the action of the taping arm 110 is initiated by the closing of the double-pole switch 278 by the tacker 90, which shifts the taping arm drive valve to cause drive cylinder 138 to move the taping arm upward, beginning its counterclockwise rotation. As shown in FIGURES 3, 4 and 5, the tape, transported by the taping arm 110, is first adhered to the bottom of the article, then to the back, top and front of the article as the taping arm is driven through the taping cycle. When the taping arm 110 reaches the forward position, shown in FIGURE 5, the tape is carried around the guide roller 224, and the torsion spring arm 226 has been turned, counterclockwise, around guide roller 224, thereby winding the spring 228. The tape is also contacted by buffer spring 218, which tacks the tape to the front of the article. When the taping arm gets to the position shown in FIGURE 5, crank 134 will have risen high enough beyond its position shown in FIGURE 2 so that its upper edge will contact actuator 251 thereby opening normally closed switch 250, de-energizing solenoid 304 through relay 282, causing tacker assembly 90 to drop away from the article. As the tacker drops, it contacts actuator 250 to close normally open switch 252, which in turn closes relay 254 which energizes solenoid 306 in connection with buffer cylinder 240, extending buffer piston rod 242 which strikes the buffer crank 238, rotating the same and the buffer plate 230.

At this point in the taping operation, the tape is held under tension between the guide roller 224 and the buffer spring 218, which latter is holding the tape against the article. The rotation of the buffer plate 230 forces the serrated knife 236 on arm 232 against the tape, severing it. The buffer plate 230 continues its clockwise rotation and the buffer arm roller 220 strikes the newly severed end of the tape, forcing that severed end against the end of the tape which was first applied to the article at the lower front corner thereof. The buffer arm roller 220 is pressed upward, against the bottom of the article, by action of buffer arm spring 235, and the buffer arm roller 220 presses the newly formed end of the tape to the bottom of the article. Through the adhesive action of the tape it adheres to the article and to the back of the tape itself where the overlap of tape is formed at the lower front corner of the article.

When the tape is severed, the release in the tension against roller guide 208 allows spring 212 to move the pinch plate 206 toward the guide roller 202. Eccentric pinch stop 204 is thus caused to contact guide roller 202, causing the tape to be pinched between the guide roller 202 and the pinch stop 204, preventing the tape from retreating up the taping arm 110. At the same time, spring 228 acts to urge spring arm 226 around the guide roller 224, forcing the free end of the tape toward guide roller 222.

When buffer piston rod 242 is fully extended (i.e. when buffer plate 230 reaches the limit of its clockwise rotation), as shown in FIGURE 6, follower 241 on said rod causes actuator 245 to contact and open normally closed switch 256, which (see FIGURE 9) results in the opening of relays 254, 257 and 258. The opening of these relays through operation of solenoids 301, 302 and 303, shifts the valves on the cylinders which are holding the fences 60 and 61, the abutment plate 45, and the vertical clamp 50, in position, so that the pressure on these clamping members is reversed. The opening of the relay 254 also acts to shift solenoid 306, operating the buffer cylinder 240, allowing the piston rod 242 to return into the cylinder 240. Spring 237 acts to return the buffer plate to its normal position on the taping arm 110.

As the pressure on the vertical clamp 50 is reversed, and it rises from the article, the double-pole switch 274 is returned to its normal position by actuator 59, and:
(1) on its normally closed side, energizes solenoid 309 to initiate the return stroke of the taping arm 110;
(2) on its normally open side, switch 274 acts as an inter-lock to prevent tacker assembly from rising because of the fact that switch 250 has been closed by the beginning of the return stroke of the taping arm 110 when actuator 251 again operates said switch 250. As taping arm 110 moves in the clockwise direction toward its normal rest position, cam disc 259, bearing an actuating protuberance, actuates the normally open double-pole double-throw switch 260 which closes single-pole single-throw relay 261. The closing of the relay 261 energizes solenoid 307, thereby causing traverse plate 75 to move toward traverse cylinder 76 through the action of traverse piston rod 77. If the selector switch 262 is in closed position, the action of the other side of switch 260 will cause the abutment plate 45 to return to its forward position, where it will contact and be stopped by the action of switch 265. If the selector switch 262 is placed in its open position, the abutment plate will remain in its retracted position, ready to receive an article of the same size as was previously wrapped.

The movement of traverse plate 75, toward the traverse cylinder 76, causes tape jaw cam follower 89 on the tape jaw 80 to engage into cam tracks 36 and 37, and the tape jaw 80 is pivoted upward at its forward end. Traverse plate 75 carries actuator cam 263 and when plate 75 moves toward the rear of the machine, that cam will contact and close one-way switch 264 which, operating solenoid 305, which operates a normally open air valve, closing it, allowing the tape jaw cylinder 88 to retract, momentarily permitting claw 86 to move away from claw 85. Switch 264 is opened when actuator cam 263 passes by switch 264, closing the claws to grip the tape tab extending from between rollers 222 and 224, on taping arm 110, which has reached its rest position. If the claws should fail to grasp the tape, the operator may, by manually closing the switch 275, cause the above action to be repeated.

At the end of the stroke of the traverse plate 75 it strikes the normally closed switch 266, opening that switch which in turn opens the relay 261, which acts to shift solenoid 307, reversing the traverse cylinder control valve and returning the traverse assembly to its original position. As the traverse plate 75 returns, the end of the tape is held in the tape jaw 80 and the tape jaw is held up in the tilted position by the tension on the tape as it is stripped through the tape guides and carried toward the front of the machine, where it comes to rest under the article support plate 30 in position for the next wrapping operation.

Variations in the operation of the above described embodiment undoubtedly suggest themselves, and various modifications of my machine, embodying some or all of the novel features herein disclosed, can be envisioned. Such variations are comprehended, and I do not intend to be limited only to the specific embodiment herein described, but, rather, I intend to be limited only by my disclosure taken as a whole, including the appended claims.

What I claim is:

1. In a machine for wrapping articles with a wrapping strip, a taping arm attached to said machine for translational movement at least part way about an article to be wrapped.

2. A machine for wrapping an article with a wrapping strip, said machine comprising a supporting structure and wrapping means, said wrapping means including means for holding an end of a wrapping strip and means for bringing said wrapping strip around said article, said last-mentioned means comprising a movable member attached to said supporting structure for translational movement on said supporting structure.

3. A machine for wrapping an article with a wrapping strip, said machine comprising a supporting structure and wrapping means, said wrapping means including means for holding an end of a wrapping strip and means for attaching said wrapping strip around said article, said attaching means comprising a member mounted on said supporting structure for translational movement at least part way about said article and means for driving said member.

4. A machine for wrapping articles with a wrapping strip, said machine comprising a supporting structure including a support for an article to be wrapped, means for clamping said article to said article support, and means for wrapping said article with said wrapping strip, said wrapping means including means for holding an end of said wrapping strip and means for applying said wrapping strip around said article, said applying means comprising a member attached to said supporting structure for translational movement on said supporting structure and means for driving said member.

5. In a machine for wrapping an article with adhesive tape, a taping arm attached to said machine for translational movement to withdraw a length of tape from a supply thereof and to apply the same about the periphery of an article, said arm carrying means for threading and guiding said tape downwardly along said arm, said arm also carrying means for arresting movement of said tape upwardly along said arm, means for severing the tape and means for buffing the severed end thereof to an article about which tape has been applied.

6. In a machine for wrapping an article with adhesive tape, a wrapping combination comprising means for holding an end of said tape, tacking means for moving said end of tape against said article, and attaching means comprising a taping arm mounted for translational movement in transporting said tape around said article, severing said tape after it has been transported around said article and buffing the severed end of said tape against said article.

7. In a machine for wrapping articles with adhesive tape, means for attaching said tape to an article, said attaching means comprising a taping arm mounted for translational movement in transporting said tape around said article, means for severing said tape after it has been transported around said article and means for buffing the severed end of said tape against said article, said severing means comprising a cutting edge and said buffing means comprising a rotatable roller, both of which severing means and buffing means are attached to a rotatable plate.

8. In a machine for wrapping articles with adhesive tape, means for attaching said tape to an article, said attaching means comprising means for transporting said tape around said article, means for severing said tape after it has been transported around said article and means for buffing the severed end of said tape against said article, said severing means comprising a cutting edge and said buffing means comprising a rotatable roller, both of said severing means and buffing means being attached to a rotatable member, said rotatable member being attached to a counter-rotatable plate.

9. In a machine for wrapping articles with adhesive tape, in combination, means for holding an end of said tape adjacent an article to be wrapped and means for tacking said end against said article, said holding means including claw members at least one of which is movable and said tacking means including at least two co-pivotally mounted members.

10. In a machine for wrapping articles with adhesive tape, the combination comprising an assembly for holding an end of said tape adjacent an article to be wrapped and an assembly for tacking said end against said article, means being provided for moving said holding assembly and said tacking assembly in a lateral direction at the same time, means also being provided for causing cooperative movement between said assemblies to tack said tape to an article.

11. In a machine for wrapping an article with adhesive tape, tacking means for moving an end of said tape against an article to be wrapped, said tacking means comprising two co-pivotally mounted plates, a pressing roller attached to one of said plates and a tacker face mounted on the other of said plates, said plates being provided with interconnecting means to produce cooperative movement between said roller and said tacker face for tacking said tape to an article.

12. In a machine for wrapping articles with adhesive tape, means for holding an end of said tape, said holding means comprising two claw members, one of which members is pivotally movable, the other member of which is fixed, a spring acting to bias said movable claw member away from said fixed claw member, said movable claw member having an inclined surface, a roller normally bearing on said surface to urge said movable claw member toward said fixed claw member, a pivotable arm for said roller, said roller being attached thereto, said arm pivoting as said movable claw member moves toward said fixed claw member.

13. In a machine for wrapping an article with a wrapping strip, a support for an article to be wrapped and means for clamping said article to said support, said clamping means comprising a vertically positionable fence and means for forcing said article against said fence and said article support, said fence including at least two members pivotally mounted at the side of said article support, means being provided for positioning said members in vertical alignment upward from said article support and means for maintaining said members in said alignment.

14. A machine for wrapping an article with a wrapping strip, said machine comprising a supporting structure including a support for an article on said support, means for positioning said article on said support, means for clamping said article in position on said support, means for guiding a supply of said wrapping strip to be attached to said article, said guiding means including means for providing tension in said wrapping strip, and means for wrapping said article with said wrapping strip, said wrapping means including means for holding an end of said wrapping strip, means for tacking said wrapping strip against said article, and means for applying said wrapping strip around said article, said applying means comprising a taping arm mounted for translational movement by driving means.

15. A machine for wrapping articles with adhesive tape, said machine comprising a supporting structure including a support for an article to be wrapped, means for positioning said article on said support, means for clamping said article to said support, means for guiding a supply of said tape to be atached around said article, said guiding means including means for retarding the movement of said tape through said guiding means to provide tension in said tape and take-up means for eliminating slack from said tape during movement thereof through said guiding means, pinching means for preventing movement of untensioned tape through said guiding means, and means for wrapping said article with said tape, said wrapping means including means for holding an end of said tape, means for tacking said tape against a corner of said article, and means for applying said tape around said article, said applying means comprising a taping arm mounted for translational movement, means for driving said taping arm, said taping arm including means for severing said tape after it has been applied around said article, and means for buffing the severed end of said tape to said article.

16. A machine for wrapping articles with adhesive tape, said machine comprising a supporting structure including a support for an article to be wrapped, means for clamping said article to said support and means for wrapping said article with said tape, said wrapping means including means for holding an end of said tape, means for tacking said end of tape against said article and means for applying said tape to said article, said applying means comprising a taping arm attached to at least two rotatable members and means for rotating said members to transport said taping arm in a substantially translational movement at least part way about said article.

17. A machine for wrapping articles with adhesive tape, said machine comprising a supporting structure including a support for an article to be wrapped and means for applying said tape to said article, said applying means comprising a taping arm attached to at least two rotatable members and means for rotating said members to transport said taping arm in a substantially translational movement at least part way about said article.

18. A machine for wrapping articles with adhesive tape, said machine comprising a supporting structure and means for applying said tape to an article, said applying means comprising a taping arm attached to two rotatable cranks and means for rotating said cranks to transport said taping arm in a substantially translational movement at least part way about said article.

References Cited in the file of this patent

UNITED STATES PATENTS

| | | |
|---|---|---|
| 1,571,573 | Cranston | Feb. 2, 1926 |
| 2,780,044 | Dwyer | Feb. 5, 1957 |

FOREIGN PATENTS

| | | |
|---|---|---|
| 575,930 | Canada | May 19, 1959 |

UNITED STATES PATENT OFFICE
CERTIFICATE OF CORRECTION

Patent No. 3,014,322                      December 26, 1961

John A. Polster

It is hereby certified that error appears in the above numbered patent requiring correction and that the said Letters Patent should read as corrected below.

Column 4, line 40, after "or" insert -- as --; column 6, lines 3 to 6, strike out "steel box 32 of which article support plate 30 forms the top. Article support plate 30 contains an opening 35 extending along its center, and beneath that opening, inside the said rectangular"; column 10, line 58, for "force" read -- forces --; column 16, line 31, for "on said support" read -- to be wrapped --; line 49, for "atached" read -- attached --.

Signed and sealed this 8th day of May 1962.

(SEAL)
Attest:

ERNEST W. SWIDER                      DAVID L. LADD
Attesting Officer                      Commissioner of Patents